J. WEBER.
HARROW.

No. 192,356.                     Patented June 26, 1877.

Witnesses.                          Inventor
H. C. Campbell                      Jacob Weber
G. McGregor                         by O. D. Levis
                                    his Attorney

UNITED STATES PATENT OFFICE.

JACOB WEBER, OF ALLEGHENY, PENNSYLVANIA, ASSIGNOR OF ONE-HALF HIS RIGHT TO JOHN M. STOKER, OF SAME PLACE.

IMPROVEMENT IN HARROWS.

Specification forming part of Letters Patent No. 192,356, dated June 26, 1877; application filed March 28, 1877.

*To all whom it may concern:*

Be it known that I, JACOB WEBER, of Allegheny, Pennsylvania, have invented an Improvement in Harrows, of which the following is a specification:

The object of my invention is to perform the operation of harrowing in a better manner than the ordinary method, and save the labor of walking and handling of the harrow. This I accomplish by constructing what I call a "sulky-carriage" having two wheels, W, axle A, tongue T, and a seat, S, for the driver.

Figure 1:
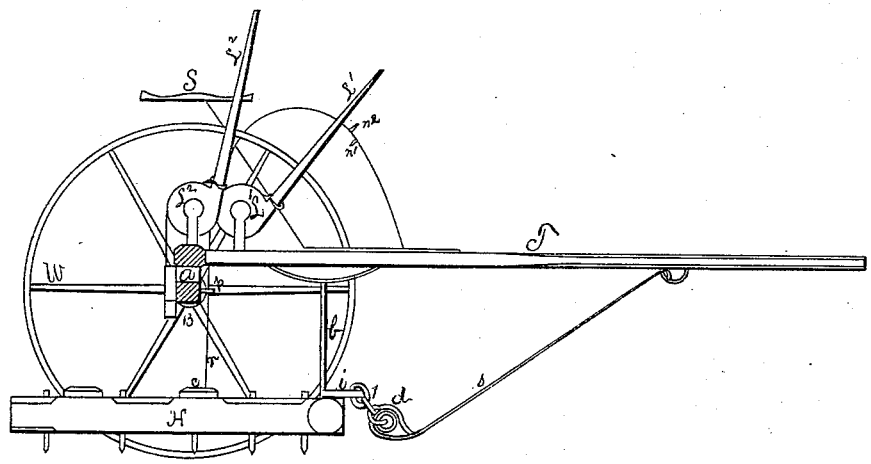

I suspend the harrow H underneath the axle A on a swinging bolster, B, by ropes $r$ $r^1$. The ends of the bolster B are provided with pins or small pulley-wheels $p$ on the front side. One end of the rope $r$ is fastened to a cross-tie, $c$, on the harrow H near the center, and is then passed over the pin or pulley-wheel $p$, and along the front of the bolster B to the center, where it is passed under a pin or pulley-wheel. A rope, $r^1$, from the other side of the harrow H is brought to the center in the same way. The ends of the two ropes are then twisted together and fastened on a wheel or lever, $L^1$, near the seat S, so that the driver can, by drawing it forward, raise the harrow H out of and off the ground. It may be moved from place to place with safety and ease. To the under side of the tongue T, and just above the front end of the harrow H, an iron rod or brace, $b$, is attached, which prevents the front part of the harrow H from rising too high. The double-tree $d$ is attached to the front end of the harrow H by links 1 on an iron clevis, $i$, extending across the front of the harrow H, so that it may adjust itself to the angles and turns to be made. A strap, $s$, connects the double-tree $d$ with the tongue T. The lever $L^2$ is intended to press the harrow H down. The levers $L^1$ $L^2$ are held forward by means of notched supports $n^1$ $n^2$ properly arranged on the upper side of the tongue T, as shown in the vertical sectional view, Fig. 1.

Figure 2:
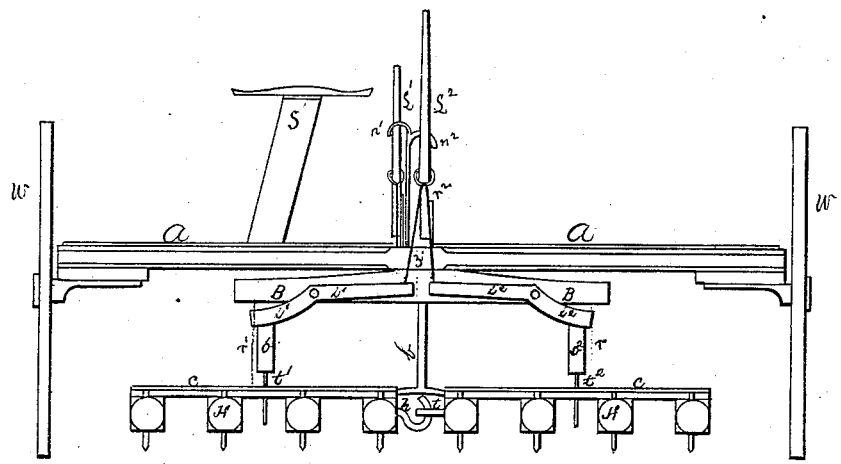

The improvement is illustrated more fully in the rear view, Fig. 2, which shows the double harrow H coupled together by hook $h$ and staple $t$, the bolster B having the levers $l^1$ $l^2$ attached with the iron pins $t^1$ $t^2$, which pass through the cross-tie $c$ with the collar $o^1$ $o^2$, the rope $r^2$ attached to the lever $L^2$, seat S, and the brace $b$.

The operation of harrowing is performed by pressing the lever $L^2$ forward into the notch $n^2$. This draws the ends of the levers $l^1$ $l^2$ up and presses the harrow H down on the ground. When down, and wishing to move the harrow H, the lever $L^2$ is removed from the notch $n^2$, and the lever $L^1$ is then pressed forward into the notch $n^1$. This raises the harrow H up, so that it will not touch the ground, and can be conveyed from place to place with ease and safety. The bolster B is fastened by a bolt, 3, so that while harrowing it will turn or swing, so as to adjust the harrow H to the draft of the horses when turning without strain.

Having thus described my invention, what I claim as new, and desire to secure by Letters Patent, is—

1. The combination of the double harrow H, swinging bolster B, levers $l^1$ $l^2$, ropes $r$ $r^1$ $r^2$, levers $L^1$ $L^2$, brace $b$, seat S, tongue T, double-tree $d$, as attached to the sulky-carriage in the manner stated, as and for the purposes hereinbefore specified and described.

2. The swinging bolsters B, with levers $l^1$ $l^2$, ropes $r$ $r^1$ $r^2$, iron pins $t^1$ $t^2$, collars $o^1$ $o^2$, as connected and attached to the levers $L^1$ $L^2$, as herein specified and described, and for the purposes set forth.

3. The arrangement of levers $l^1$ $l^2$, on the movable or swinging bolster B, with the attachment as connected and attached to the axle A, as and for the purposes hereinbefore set forth.

JACOB WEBER.

Witnesses:
O. D. LEVIS,
G. McGREGOR.